Feb. 16, 1932.   R. K. LEE   1,845,803
MOTOR MOUNTING
Filed March 23, 1928
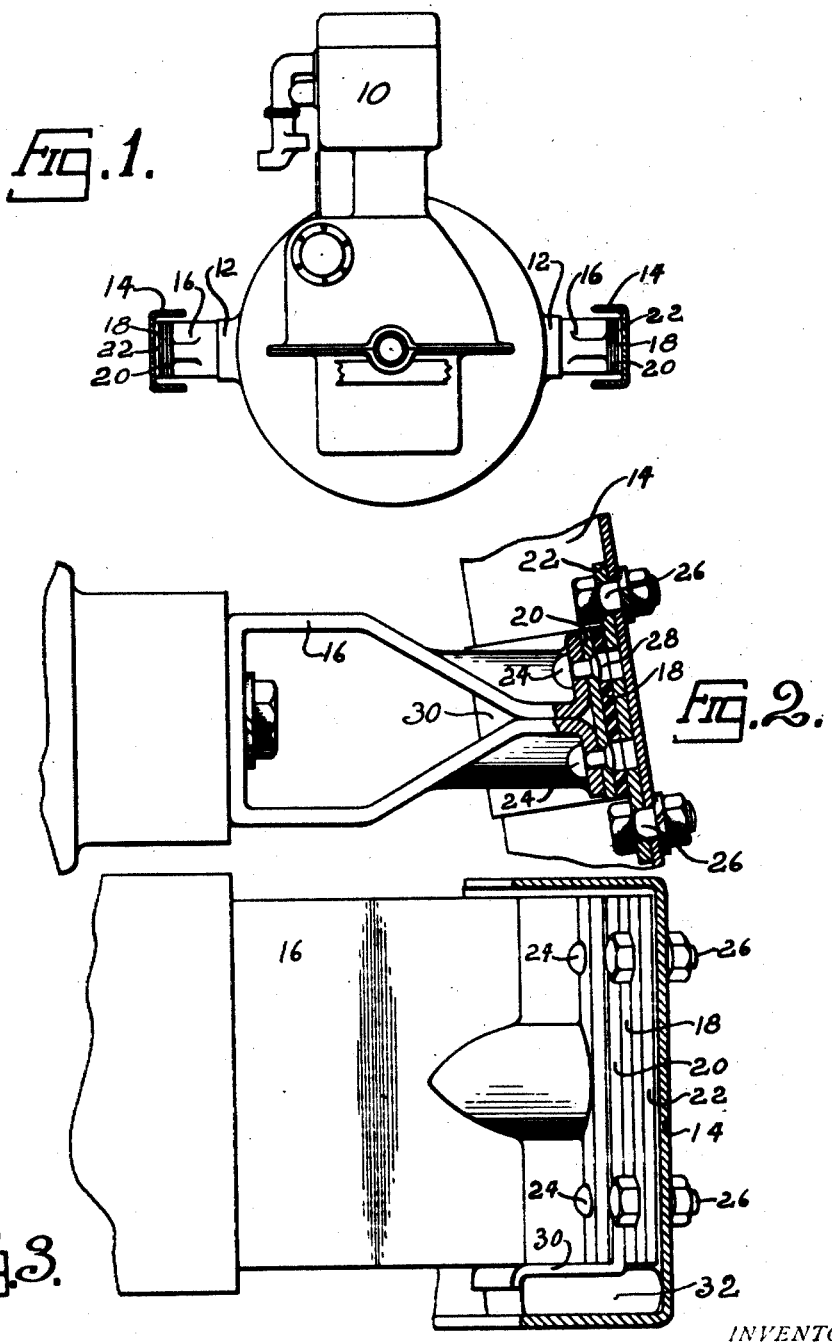
INVENTOR
ROGER K. LEE.
BY
Johns Harness
ATTORNEY Patented Feb. 16, 1932

1,845,803

UNITED STATES PATENT OFFICE

ROGER K. LEE, OF DETROIT, MICHIGAN, ASSIGNOR TO CHRYSLER CORPORATION, OF DETROIT, MICHIGAN, A CORPORATION OF DELAWARE

MOTOR MOUNTING

Application filed March 23, 1928. Serial No. 264,258.

This invention relates to a resilient mounting and more particularly to a mounting adapted to dampen out vibrations between a member such as an internal combustion engine and its support.

An object of the invention is to provide an inexpensive mounting of elastic material which is subjected to a tension.

Another object of the invention is to provide a construction which is easily assembled or disassembled.

Other objects and advantages will more fully appear from the following description taken in connection with the accompanying drawings in which:

Fig. 1 is an end view of an internal combustion engine showing the frame members of an automobile chassis in section.

Fig. 2 is a plan view of the mounting, parts being broken away and in section, showing a slightly modified form of my invention.

Fig. 3 is a side view of Fig. 2, the frame member being in section.

In the mounting of an internal combustion engine in a vehicle frame it has been found that it is necessary to have a certain amount of stability in a direction transverse to the engine and frame, and at the same time to absorb vertical and fore and aft vibration of the engine relative to the frame. I have provided a mounting of the type which can be designed for any engine to give the necessary flexibility in one direction and yet provide a given stability, independent of the necessary flexibility in another direction.

Referring to the illustrated embodiment of my invention, I have shown an internal combustion engine 10 having laterally projecting arms 12. Frame members 14 have been illustrated as the frame members of an automobile chassis adapted to form the support for the engine 10. A stamping 16 has been shown secured to the arm 12 and is adapted to receive at its outer end a connection which comprises an important part of my invention. A rubber member 18, shown in the form of a pad, has its opposite faces provided with metallic plates 20 and 22 which are vulcanized thereto. The plate 20 is secured to the stamping 16 in any convenient manner, such as by rivets 24, and the plate 22 is shown detachably secured to the frame member 16 by bolts 26. The rubber member 18 and the plates 20 and 22 are formed as a unit and an aperture 28 has been provided to receive the rivets 24, the heads of which engage the plate 20.

In Fig. 1 I have shown the mounting as supporting the engine 10 solely through the rubber pad 18, the latter being under tension. Heretofore rubber blocks or supports have been used to insulate the engine from the frame but as these blocks have been under compression they do not eliminate small vibrations set up by the motor because the blocks are compressed.

By securing the engine to the frame through an elastic member the support is more resilient and the small vibrations are eliminated. It will be understood that the entire weight of the motor as shown in Fig. 1 will be supported through the rubber mounting which is under tension.

In Fig. 3 I have provided the plate 20 with an inwardly turned flange 30 adapted to engage a resilient member such as a rubber block 32. The rubber block is supported on the lower flange of the side frame member 14 and is adapted to take a portion of the engine load. This block is intended for use only when a heavy load is to be supported and there is danger of the rubber member 18 tearing apart. However, it is to be understood that under certain conditions the rubber member 18 is sufficient to support a normal load.

It will be understood that as the rubber members are under tension, by the weight of the engine, horizontal movement of the latter is restricted more as the rubber members are more dense and solid than the usual rubber mounting due to the rubber members being under tension.

It will be obvious that various changes may be made in the arrangement, combination and construction of the various parts of my improved device without departing from the spirit of my invention and it is my intention to cover by my claims such changes as may reasonably be included within the scope thereof.

What I claim is:

1. In combination, a plate like rubber member, a plate like metallic member bonded to each of the opposite faces of said rubber member forming a mounting unit, means for securing to one of said metallic members a part of an internal combustion engine, and means for securing the other metallic member to a chassis frame, said rubber member being held under tension by the load of said engine and resisting horizontal movement of said engine throughout its area by resistance to compression of the rubber member.

2. In combination, a plate like rubber member, a plate like metallic member bonded to each of the opposite faces of said rubber member forming a mounting unit, means for securing to one of said metallic members a vibrating mass, and means for securing the other metallic member to a supporting member, said rubber means supporting said vibrating mass by tension on said rubber member and resisting horizontal movement of said vibrating mass by resistance to compression throughout the bonded area of the rubber with the metallic plates.

3. In combination, a plate like rubber member, a plate like metallic member bonded to each of the opposite faces of said rubber member forming a mounting unit, means for securing to one of said metallic members a part of an internal combustion engine having vertical and horizontal forces, and means for securing the other metallic member to a chassis frame, said rubber member resisting by tension the vertical forces of said engine and resisting by compression throughout the bonded area of said rubber member the horizontal forces of said engine.

4. In combination, a plate like rubber member, a metallic member bonded to one face of said rubber member, a metallic member bonded to the opposite face of said rubber member, a vibrating weight secured to one of said plates, a support secured to the other of said plates, said rubber member resisting vertical and longitudinal movement of said weight through tension only on said rubber and resisting transverse movement on said weight through compression only.

5. In combination, a motor vehicle engine and frame, a plate like non-metallic member held under elastic tension between the engine and the frame and serving to connect them, said non-metallic member resisting vertical vibration of said engine through tension on said non-metallic member and resisting horizontal movement of said engine by resistance to compression throughout the area of said non-metallic member.

ROGER K. LEE.